US008566426B2

(12) United States Patent   (10) Patent No.: US 8,566,426 B2
Ooba                        (45) Date of Patent:     Oct. 22, 2013

(54) DATA PROCESSING APPARATUS, DATA PROCESSING METHOD, AND COMPUTER PROGRAM

(75) Inventor: Hideaki Ooba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1064 days.

(21) Appl. No.: 11/566,157

(22) Filed: Dec. 1, 2006

(65) Prior Publication Data

US 2007/0143464 A1    Jun. 21, 2007

(30) Foreign Application Priority Data

Dec. 21, 2005   (JP) ................................. 2005-368142

(51) Int. Cl.
*G06F 15/177* (2006.01)

(52) U.S. Cl.
USPC ............................. 709/220; 709/238; 370/392

(58) Field of Classification Search
USPC ........................................................ 709/220
See application file for complete search history.

(56) References Cited

U.S. PATENT DOCUMENTS

| | | | | |
|---|---|---|---|---|
| 5,138,611 A * | 8/1992 | Carn et al. | .................. | 710/316 |
| 5,974,458 A * | 10/1999 | Abe et al. | ...................... | 709/224 |
| 6,006,275 A * | 12/1999 | Picazo et al. | .................. | 709/249 |
| 6,172,981 B1 * | 1/2001 | Cox et al. | ..................... | 370/401 |
| 6,195,356 B1 * | 2/2001 | Anello et al. | ................. | 370/398 |
| 6,324,178 B1 * | 11/2001 | Lo et al. | ......................... | 370/392 |
| 6,466,779 B1 * | 10/2002 | Moles et al. | ................... | 455/410 |
| 6,614,809 B1 * | 9/2003 | Verma et al. | .................. | 370/469 |
| 6,701,361 B1 * | 3/2004 | Meier | ............................ | 709/224 |
| 6,857,027 B1 * | 2/2005 | Lindeborg et al. | ............ | 709/239 |
| 6,901,076 B2 * | 5/2005 | Perlman et al. | ................ | 370/401 |
| 7,072,337 B1 * | 7/2006 | Arutyunov et al. | ........... | 370/389 |
| 7,193,996 B2 * | 3/2007 | Dobbins et al. | ............... | 370/392 |
| 7,310,351 B2 * | 12/2007 | Asano et al. | ................... | 370/466 |
| 7,433,325 B1 * | 10/2008 | Sagy et al. | ..................... | 370/254 |
| 7,443,880 B2 * | 10/2008 | Wetterwald et al. | .......... | 370/466 |
| 7,684,317 B2 * | 3/2010 | March et al. | ................... | 370/229 |
| 8,005,021 B2 * | 8/2011 | Thomas et al. | ................ | 370/257 |
| 2002/0085585 A1 * | 7/2002 | Tzeng | ............................ | 370/475 |
| 2002/0154328 A1 * | 10/2002 | Sato | ............................. | 358/1.13 |
| 2003/0046580 A1 * | 3/2003 | Taniguchi et al. | ............. | 713/200 |
| 2003/0067914 A1 * | 4/2003 | Kim | ................................ | 370/389 |
| 2003/0210696 A1 * | 11/2003 | Goldflam | .................... | 370/395.1 |
| 2004/0008722 A1 * | 1/2004 | G. Ellis et al. | ................. | 370/461 |
| 2004/0017476 A1 * | 1/2004 | Nagashima et al. | ........ | 348/207.2 |
| 2004/0022257 A1 * | 2/2004 | Green et al. | ................... | 370/401 |
| 2004/0024903 A1 * | 2/2004 | Costatino et al. | ............. | 709/238 |
| 2004/0109460 A1 * | 6/2004 | Banks et al. | ................... | 370/401 |
| 2005/0117177 A1 * | 6/2005 | Niitsuma | ..................... | 358/1.15 |
| 2006/0031570 A1 * | 2/2006 | Blackwell et al. | ............ | 709/238 |
| 2006/0056297 A1 * | 3/2006 | Bryson et al. | ................. | 370/230 |
| 2006/0077981 A1 * | 4/2006 | Rogers | ...................... | 370/395.21 |
| 2006/0133363 A1 * | 6/2006 | Dumet et al. | ................. | 370/389 |

(Continued)

FOREIGN PATENT DOCUMENTS

JP     2002-312140 A    10/2002

*Primary Examiner* — Hamza Algibhah

(74) *Attorney, Agent, or Firm* — Canon U.S.A., Inc. IP Division

(57) ABSTRACT

A data processing apparatus includes a plurality of connecting units that individually connect to a first network to which a predetermined data processing apparatus is connected and a second network, and a determining unit that determines that a connecting unit that receives data including an address of the predetermined data processing apparatus as a source address is connected to the first network.

13 Claims, 6 Drawing Sheets

(56) References Cited

U.S. PATENT DOCUMENTS

| | | | |
|---|---|---|---|
| 2006/0133413 A1* | 6/2006 | Bousis | 370/466 |
| 2006/0140213 A1* | 6/2006 | Hwang et al. | 370/466 |
| 2006/0159029 A1* | 7/2006 | Samuels et al. | 370/252 |
| 2006/0168318 A1* | 7/2006 | Twiss | 709/238 |
| 2006/0221868 A1* | 10/2006 | de Heer et al. | 370/257 |
| 2006/0221955 A1* | 10/2006 | Enright | 370/389 |
| 2006/0265644 A1* | 11/2006 | Koizumi | 715/522 |
| 2007/0053342 A1* | 3/2007 | Sierecki et al. | 370/351 |
| 2007/0115885 A1* | 5/2007 | Singh et al. | 370/331 |
| 2007/0143464 A1* | 6/2007 | Ooba | 709/223 |
| 2008/0019367 A1* | 1/2008 | Ito et al. | 370/392 |
| 2008/0062878 A1* | 3/2008 | Habetha et al. | 370/235 |
| 2008/0080524 A1* | 4/2008 | Tsushima et al. | 370/401 |
| 2008/0130572 A1* | 6/2008 | Zhang et al. | 370/331 |
| 2009/0043889 A1* | 2/2009 | Gobara et al. | 709/225 |

* cited by examiner

DATA PROCESSING APPARATUS, DATA PROCESSING METHOD, AND COMPUTER PROGRAM

BACKGROUND OF THE INVENTION

1. Field of the Invention

The present invention relates to a data processing apparatus that includes a plurality of connecting units individually connected to a plurality of networks, a data processing method performed in the data processing apparatus, and a computer program for controlling the data processing apparatus.

2. Description of the Related Art

A known type of data processing apparatus includes a plurality of connecting units connected to networks. For example, a print control apparatus disclosed in Japanese Patent Laid-Open No. 2002-312140 is connected to a network to which a terminal unit is connected and a network to which an image forming apparatus is connected. The print control apparatus communicates with the terminal unit and the image forming apparatus via the networks. For example, the print control apparatus receives print data from the terminal unit and sends data based on the print data to the image forming apparatus.

In such a known type of data processing apparatus, a plurality of connecting units are connected to respective fixed networks.

For example, in the print control apparatus disclosed in Japanese Patent Laid-Open No. 2002-312140, a plurality of connecting units have individual functions. A first connecting unit is connected to the network to which the image forming apparatus is connected, and a second connecting unit is connected to the network to which the terminal unit is connected. These connections are fixed. Thus, for example, when the second connecting unit is connected to the network to which the image forming apparatus is connected, the print control apparatus cannot normally operate, and the image forming apparatus cannot print data sent from the terminal unit.

In order to connect the networks correctly to the connecting units, a simple description or illustration needs to be shown around the connecting units, and a user needs to connect the networks correctly to the connecting units with reference to the description or illustration and a manual of the data processing apparatus. In any case, the user needs to pay technical attention to connect the networks correctly to the connecting units.

SUMMARY OF THE INVENTION

According to an aspect of the present invention, a data processing apparatus is provided which includes a plurality of connecting units that are each individually configured to be able to be connected to at least one of a plurality of networks; a first address storage unit configured to store a predetermined address; a second address storage unit configured to store an address of a predetermined data processing apparatus; and a control unit configured to assign the predetermined address stored in the first address storage unit to a first one of the plurality of connecting units, wherein the first one of the connecting units is configured to receive data including the address stored in the second address storage unit as a source address.

According to another aspect of the present invention, the data processing apparatus may further include an address input unit configured to input an address to be assigned to any one of the plurality of connecting units, wherein the control unit assigns the address input through the address input unit to a second one of the plurality of connecting units.

According to yet another aspect of the present invention, the control unit may be configured to determine whether the source address included in the data received by the first one of the connecting units coincides with the address stored in the second address storage unit, and when the control unit determines that the source address coincides with the address stored in the second address storage unit, the control unit assigns the address stored in the first address storage unit to the first one of the connecting units.

Moreover, according to another aspect of the present invention, the data processing apparatus may further include a conversion unit configured to convert print data received via the plurality of networks to data that can be interpreted by the predetermined data processing apparatus, wherein a second one of the plurality of connecting units receives the print data via the plurality of networks, and the first one of the connecting units sends the converted data via the plurality networks.

Furthermore, according to still yet another aspect of the present invention, a data processing apparatus is provided which includes a plurality of connecting units that are each individually configured to be able to be connected to a first network to which a predetermined data processing apparatus is connected and a second network; and a determining unit configured to determine whether any one of the plurality of connecting units that receives data including an address of the predetermined data processing apparatus as a source address is connected to the first network.

Also, according to yet another aspect of the present invention, a data processing method is provided which may be performed in a data processing apparatus that includes a plurality of connecting units that are each individually configured to be able to be connected to at least one of a plurality of networks. Here, the method includes receiving data through a first one of the plurality of connecting units; determining whether a source address of the received data coincides with an address of a predetermined data processing apparatus; and assigning, when it is determined that the source address of the received data coincides with the address of the predetermined data processing apparatus, a predetermined address to a second one of the plurality of connecting units.

Additionally, according to another aspect of the present invention, the predetermined address and the address of the predetermined data processing apparatus are stored in the data processing apparatus.

Moreover, according to another aspect of the present invention, the method may further include inputting an address to be assigned to the second one of the plurality of connecting units; and assigning the input address to the second one of the connecting units.

Still yet, according to another aspect of the present invention, the method may further include converting print data received via the plurality of networks to data that can be interpreted by the predetermined data processing apparatus, wherein another one of the plurality of connecting units other than the first one of the connecting units receives the print data via the plurality of networks, and the first one of the connecting units sends the converted data via the plurality of networks.

And moreover, according to yet another aspect of the present invention, a data processing method is provided which may be performed in a data processing apparatus that includes a plurality of connecting units that are each individually configured to be connected to a first network to which a predetermined data processing apparatus is connected and a second network. Here, the method includes receiving data through a first one of the plurality of connecting units; determining whether a source address of the received data coincides with an address of the predetermined data processing apparatus; and determining, when it is determined that the source address of the received data coincides with the address of the predetermined data processing apparatus, that the first one of the connecting units is connected to the first network.

Furthermore, according to another aspect of the present invention, a computer readable medium is provided containing computer-executable instructions for controlling a data processing apparatus that includes a plurality of connecting units that are each individually configured to be able to be connected to at least one of a plurality of networks. The computer readable includes computer-executable instructions for receiving data through a first one of the plurality of connecting units; computer-executable instructions for determining whether a source address of the received data coincides with an address of a predetermined data processing apparatus; and computer-executable instructions for assigning, when it is determined that the source address of the received data coincides with the address of the predetermined data processing apparatus, a predetermined address to the first one of the connecting units.

And still yet, according to another aspect of the present invention, a computer readable medium is provided which contains computer-executable instructions for controlling a data processing apparatus that includes a plurality of connecting units that are each individually configured to be able to be connected to a first network to which a predetermined data processing apparatus is connected and a second network. Here, the computer readable medium includes computer-executable instructions for receiving data through a first one of the plurality of connecting units; determining whether a source address of the received data coincides with an address of the predetermined data processing apparatus; and determining, when it is determined that the source address of the received data coincides with the address of the predetermined data processing apparatus, that the first one of the connecting units is connected to the first network.

Further features of the present invention will become apparent from the following description of exemplary embodiments with reference to the attached drawings.

DESCRIPTION OF THE EMBODIMENTS

Figure 1:
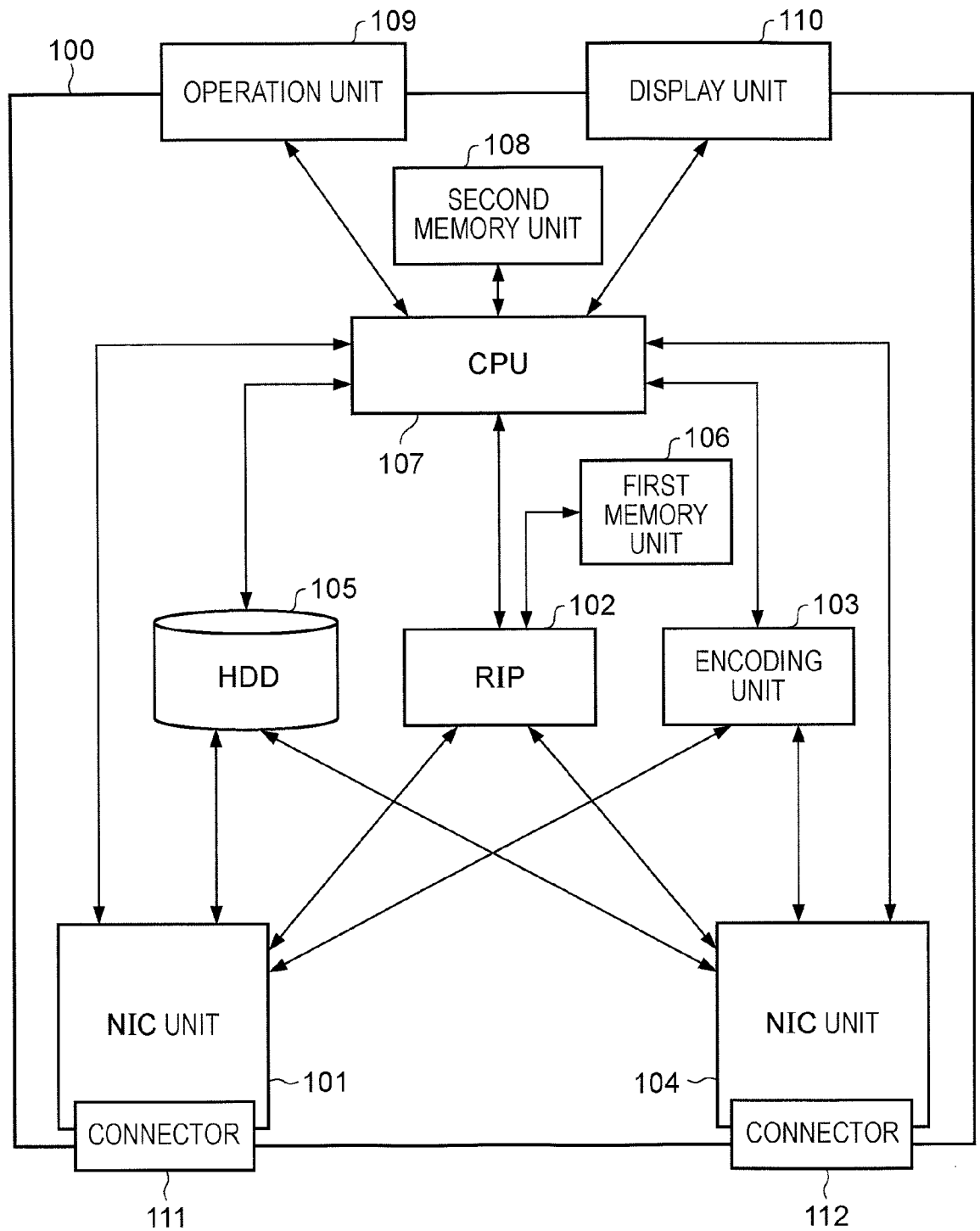
FIG. 1 shows an example structure of a print control apparatus as a data processing apparatus according to an exemplary embodiment.

FIG. 1 shows an example structure of a print control apparatus 100 as a data processing apparatus according to an exemplary embodiment. A network interface card (NIC) unit 101 as a first network interface controls connection to a local area network (LAN) at a low-level layer. The NIC unit 101 includes a connector 111 to which a LAN cable is connected. An NIC unit 104 as a second network interface controls connection to a LAN at a low-level layer. The NIC unit 104 includes a connector 112 to which a LAN cable is connected.

A raster image processor (RIP) 102 performs image rendering to generate raster image data from print data described in a print language such as a page description language (PDL) or print data in a specific data format, for example, print data compressed using the Joint Bi-level Image experts Group (JBIG) method. The print control apparatus 100 receives these types of print data from the outside via a LAN.

An encoding unit 103 converts the raster image data to data in a data format supported by a corresponding image forming apparatus.

A hard disk drive (HDD) 105 temporarily stores (spools) print data received through the NIC unit 101 or 104. A first memory unit 106 is a memory used by the RIP 102 performing image rendering.

A central processing unit (CPU) 107 performs overall control of the print control apparatus 100. A second memory unit 108 is a memory used by the CPU 107 as an area for temporarily storing data.

An operation unit 109 includes buttons, keys, touch panels, and the like. A user uses the operation unit 109 to operate the print control apparatus 100. A display unit 110 distributes information to the user in the form of images, characters, and symbols.

Figure 2:
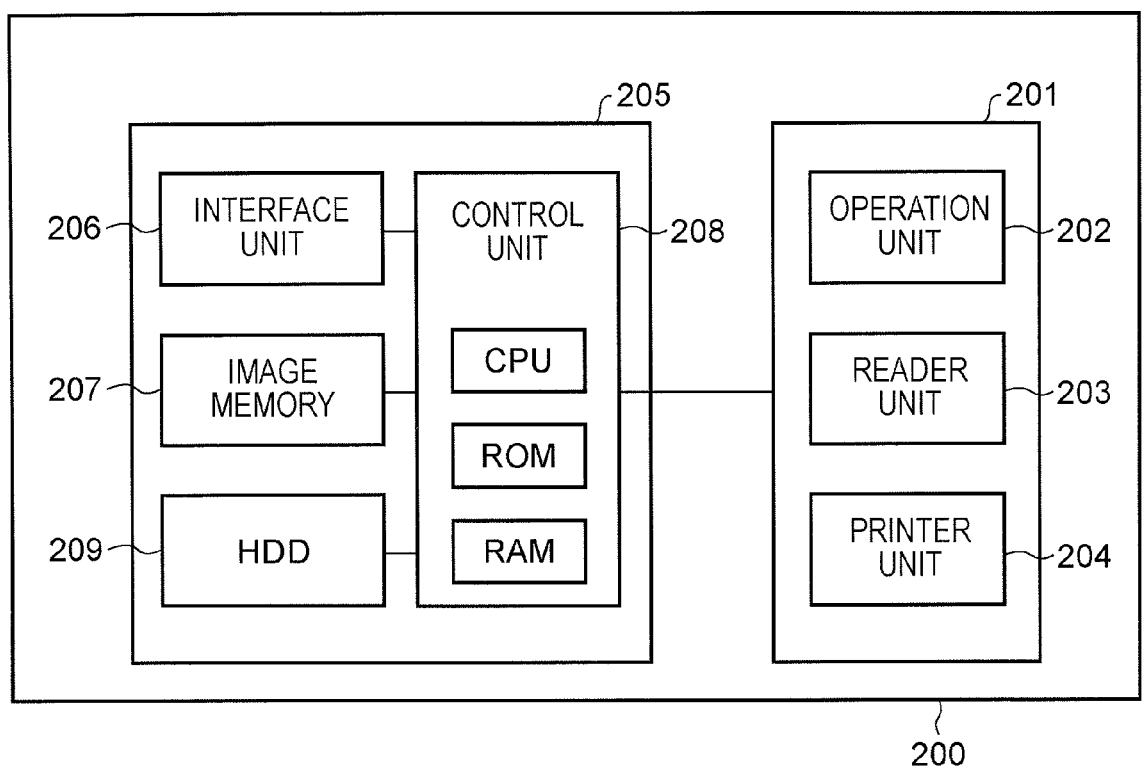
FIG. 2 shows an example structure of an image forming apparatus as an exemplary predetermined data processing apparatus according to an aspect of the present invention.

FIG. 2 shows an example structure of an image forming apparatus 200 as an exemplary predetermined data processing apparatus. The image forming apparatus 200 includes an image-forming-apparatus main unit 201 and an image input/output control unit 205. The image-forming-apparatus main unit 201 includes an operation unit 202, a reader unit 203, and a printer unit 204. The image input/output control unit 205 includes an interface unit 206, an image memory 207, a control unit 208 and an HDD 209.

The operation unit 202 is used by the user to operate the image-forming-apparatus main unit 201 and the image input/output control unit 205. The reader unit 203 reads an image of a document and outputs image data corresponding to the image of the document to the printer unit 204 or the image input/output control unit 205. The printer unit 204 prints on recording paper an image based on the image data input from the reader unit 203 or the image input/output control unit 205.

The interface unit 206 is an interface between the print control apparatus 100 and the control unit 208. The interface unit 206 generates image data that can be printed by the printer unit 204 from code data that represents an image sent from the print control apparatus 100 and sends the image data to the control unit 208. The interface unit 206 may be connected to the print control apparatus 100 via a LAN, for example, Ethernet (registered trademark). Alternatively, the interface unit 206 may be connected to the print control apparatus 100 via a parallel interface or an interface cable, for example, a universal serial bus (USB) interface.

The image memory 207 is a memory that stores image data. The control unit 208 includes a CPU, a read only memory (ROM), a random access memory (RAM), and the like. The CPU in the control unit 208 loads a program stored in the ROM or another storage medium into the RAM and executes the program to control data flow between the reader unit 203, the interface unit 206, the image memory 207, and the like.

The HDD 209 stores various types of settings configured in the image forming apparatus 200, for example, data in an address book, data related to logs of operations, data related to user settings, data related to identification (ID) settings, and data related to network settings. A nonvolatile memory that can store data even when the power supply is turned off may be provided instead of the HDD 209 to store various types of settings.

Figure 3:
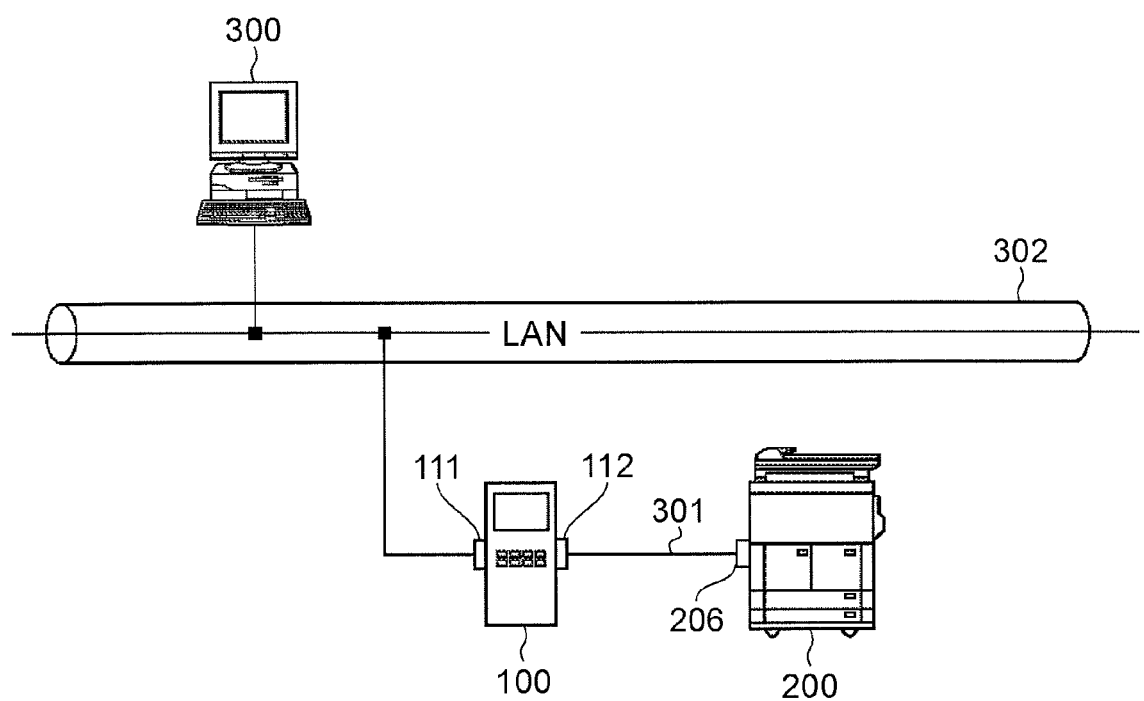
FIG. 3 shows an example structure of a network system that includes the print control apparatus, the image forming apparatus, and a host computer according to an aspect of the present invention

FIG. 3 shows an example structure of a network system that includes the print control apparatus 100, the image forming apparatus 200, and a host computer 300. The host computer 300 is connected to a LAN 302, and the image forming apparatus 200 is connected to a LAN 301 via the interface unit 206. The host computer 300 is, for example, a personal computer or a workstation. Hereinafter, it is assumed that the host computer 300 is connected to the LAN 302, and the image forming apparatus 200 is connected to the LAN 301.

On the other hand, the print control apparatus 100 is connected to the LAN 301 and the LAN 302. A network cable of the LAN 302 and a network cable of the LAN 301 can be connected to either the connector 111 or 112 as far as these network cables are connected to different connectors. In FIG. 3, the connector 111 of the print control apparatus 100 is connected to the LAN 302, and the connector 112 of the print control apparatus 100 is connected to the LAN 301. Hereinafter, the individual functions of the NIC units 101 and 104 are determined in a manner that depends on the individual connectors 111 and 112 to which the LAN 302 and the LAN 301 are connected.

A data packet sent from the host computer 300 to the print control apparatus 100 is transferred via the LAN 302 and received by the NIC unit 101 or 104 via the connector 111 or 112. When the data packet received by the NIC unit 101 or 104 is based on Transmission Control Protocol/Internet Protocol (TCP/IP), the header of the data packet includes a destination port number. In TCP/IP, a TCP packet or a User Datagram Protocol (UDP) packet is used.

A port number is information that represents a program or a process to which an apparatus that receives a data packet sends data in the data packet. Thus, different port numbers are individually assigned to communication protocols, programs, and the like. For example, the port number 21 is assigned to File Transfer Protocol (FTP), the port number 25 is assigned to Simple Mail Transfer Protocol (SMTP), and the port number 161 is assigned to Simple Network Management Protocol (SNMP).

The print control apparatus 100 checks a destination port number included in the header of the received data packet and determines whether the destination port number corresponds to print processing. The print control apparatus 100 can determine by this operation whether the data in the data packet is print data or data other than print data, for example, control data. Thus, the NIC unit 101 or 104 extracts a destination port number from the header of the received data packet and determines on the basis of the destination port number whether the data in the data packet is print data or control data.

When it is determined that the data in the data packet is print data, the NIC unit 101 or 104 writes the print data to the HDD 105 as necessary under the control of the CPU 107. The writing of the print data to the HDD 105 is queuing (spooling) operation that is performed to improve the rate of data transfer. The RIP 102 reads the print data stored in the HDD 105 according to instructions from the CPU 107. When queuing is not performed, the print data is transferred directly from the NIC unit 101 or 104 to the RIP 102 under the control of the CPU 107. The print data can be received through either the NIC unit 101 or 104 by the foregoing operation.

The RIP 102 performs image rendering on the print data to generate raster image data, and then the encoding unit 103 converts (encodes) the raster image data to data in a data format that can be interpreted by the image forming apparatus 200. The data format, which can be interpreted by the image forming apparatus 200, is preset in the encoding unit 103 according to specification from the image forming apparatus 200 or the operation unit 109. When the data format of the received print data can be directly interpreted by the image forming apparatus 200, encoding by the encoding unit 103 may be skipped. The data format of the encoded data may be a print language format or a format of data compressed using a specific method, for example, the JBIG method. The data format to be used depends on the capacity of an interpretation unit included in the image forming apparatus 200.

The NIC unit 101 or 104 generates a data packet that contains the encoded data to send the encoded data from the print control apparatus 100 to the image forming apparatus 200 via the LAN 301. The generated data packet is sent from the connector 111 or 112 of the print control apparatus 100 to the interface unit 206 of the image forming apparatus 200 via the LAN 301.

On the other hand, the image forming apparatus 200 obtains the encoded data from the data packet and prints an image corresponding to the encoded data on recording paper according to its own print procedure.

When image data of an image read by the reader unit 203 is sent from the image forming apparatus 200 to the host computer 300, a data packet that contains the image data is first generated. Then, the generated data packet is sent from the interface unit 206 to the connector 111 or 112 via the LAN 301. Then, the print control apparatus 100 checks the destination address of the data packet. When the destination address is the address of the host computer 300, the data packet received through one connector of the connectors 111 and 112 is sent from the other connector.

Figure 4:
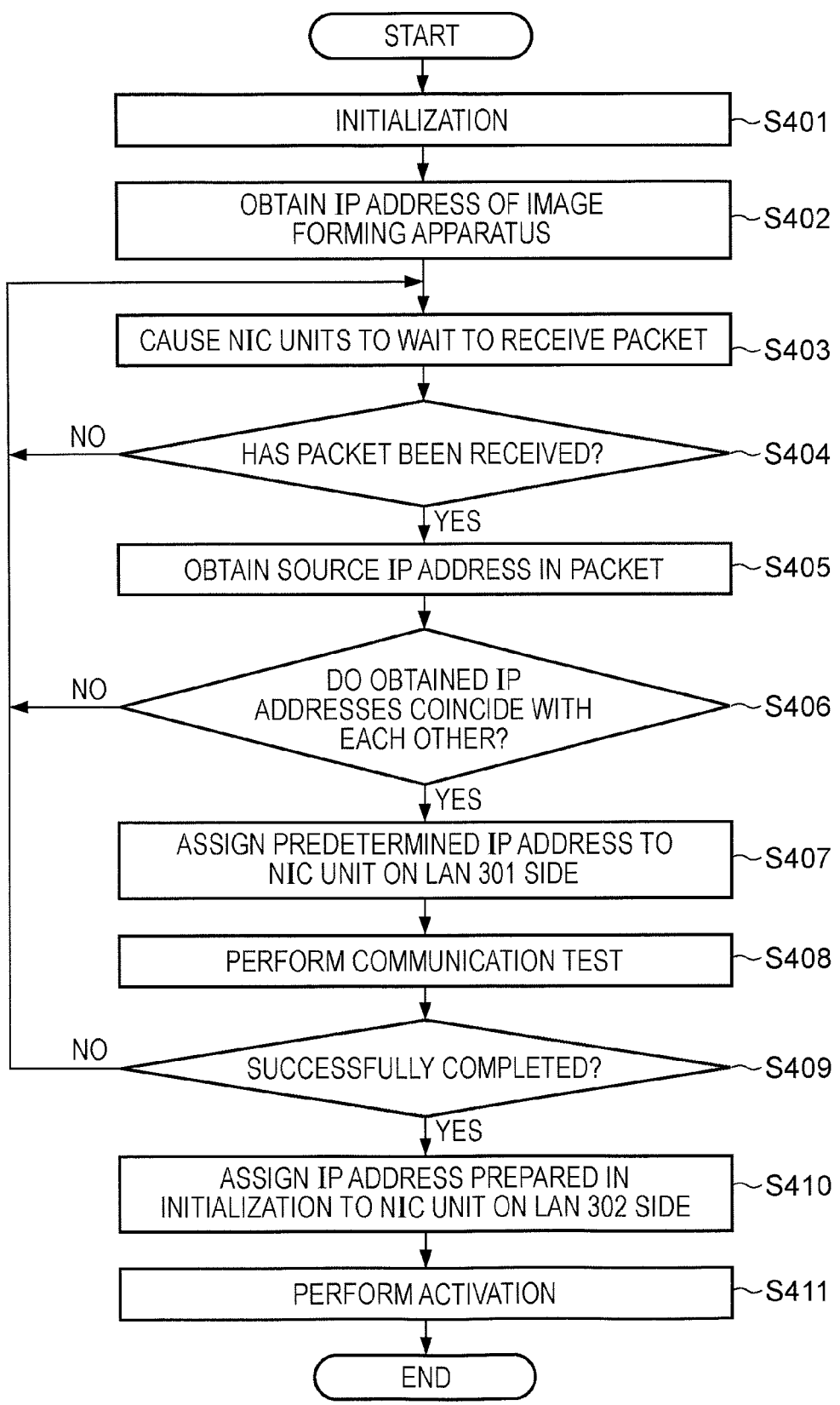
FIG. 4 is a flowchart showing an exemplary process of assigning individual addresses to network interface card (NIC) units according to an aspect of the present invention.

FIG. 4 is a flowchart showing an exemplary process of assigning individual addresses to the NIC units 101 and 104. The print control apparatus 100 performs this process by causing the CPU 107 in the print control apparatus 100 to execute a control program based on the flowchart in FIG. 4. A case will be described, in which IP is used in communication between apparatuses. However, addresses to be assigned to the NIC units 101 and 104 are not limited to IP addresses, and addresses corresponding to a network protocol used in the network are assigned to the NIC units 101 and 104.

When the power supply of the print control apparatus 100 is turned on, the process is started. In step S401, the print control apparatus 100 performs initialization. In the initialization process, the user enters from the operation unit 109 an IP address of the print control apparatus 100 in the LAN 302. The IP address set by the user is the IP address of one of the NIC units 101 and 104 corresponding to one of the connectors 111 and 112 to which the network cable of the LAN 302 is connected. Alternatively, when an arrangement, such as Dynamic Host Configuration Protocol (DHCP), is adopted, in which an IP address is automatically assigned, an IP address assigned by DHCP is input in the print control apparatus 100. The user can select one of a mode in which the user enters an IP address and a mode in which an IP address assigned by, for example, DHCP is input.

When the initialization process is completed, in step S402, the print control apparatus 100 obtains the IP address of the image forming apparatus 200. The IP address of the image forming apparatus 200 is recorded in a file, and the file is stored in the HDD 105. When the print control apparatus 100 is used in an environment in which the print control apparatus 100 is connected to the image forming apparatus 200 via the network, the image forming apparatus 200 is supposed to use the IP address recorded in the file. Thus, the print control apparatus 100 obtains the IP address of the image forming apparatus 200 from the file.

Then, in step S403, the print control apparatus 100 causes the NIC units 101 and 104 to wait to receive a packet. In this status, even when IP addresses are not assigned to the NIC units 101 and 104, the NIC units 101 and 104 can receive a packet that is addressed to a broadcast address and transferred through a LAN. Alternatively, proper IP addresses may be assigned to the NIC units 101 and 104 as default values. Even in this case, the NIC units 101 and 104 can receive a packet that is addressed to a broadcast address and transferred through a LAN regardless of the IP addresses set as the default values.

After the NIC units 101 and 104 are caused to wait to receive a packet, in step S404, the print control apparatus 100 determines whether any packet has been received by either the NIC unit 101 or 104. When the print control apparatus 100 determines that any packet has been received by neither the NIC unit 101 nor 104, the process goes back to step S403.

When the print control apparatus 100 determines that a packet has been received by either the NIC unit 101 or 104 (YES in step S404), the process proceeds to step S405. In step S405, the print control apparatus 100 checks the header of the received packet and obtains a source IP address in the packet. Then, in step S406, the print control apparatus 100 determines whether the IP addresses obtained in steps S402 and S405 coincide with each other. When the print control apparatus 100 determines that these IP addresses do not coincide with each other (NO in step S406), the process goes back to step S403 where the process of receiving a packet is performed again.

When the print control apparatus 100 determines that these IP addresses coincide with each other (YES in step S406), the process proceeds to step S407. In step S407, the print control apparatus 100 determines that the NIC unit, which has received a packet including a source IP address that coincides with the IP address of the image forming apparatus 200, is connected to the LAN 301 (hereinafter, such an NIC unit is called an NIC unit on the LAN 301 side). Then, the print control apparatus 100 assigns a predetermined IP address to the NIC unit on the LAN 301 side.

The predetermined IP address is recorded in a file, and the file is stored in the HDD 105. In addition to the predetermined IP address associated with the IP address of the image forming apparatus 200, a subnet mask, the IP address of a default gateway, and the like are recorded in the file. The print control apparatus 100 obtains the predetermined IP address from the file and assigns the predetermined IP address to the NIC unit on the LAN 301 side.

Alternatively, the predetermined IP address may be determined on the basis of the IP address of the image forming apparatus 200. In this case, the print control apparatus 100 determines the predetermined IP address by, for example, adding one to or subtracting one from the IP address of the image forming apparatus 200. Data other than the predetermined IP address, for example, a subnet mask, may be always fixed, or corresponding data of the image forming apparatus 200, for example, a subnet mask, may be used as the data other than the predetermined IP address.

In step S408, the print control apparatus 100 performs communication test between the print control apparatus 100 and the image forming apparatus 200. In the communication test, the print control apparatus 100 sends a packet from the NIC unit on the LAN 301 side to the image forming apparatus 200. When the print control apparatus 100 has received a response packet corresponding to the packet from the image forming apparatus 200, the print control apparatus 100 determines that the print control apparatus 100 can normally communicate with the image forming apparatus 200, and the communication test is normally completed.

Then, in step S409, the print control apparatus 100 determines whether the communication test has been normally completed. If the print control apparatus 100 determines that the communication test has not been normally completed (NO in step S409), the process goes back to step S403.

When the print control apparatus 100 determines that the communication test has been normally completed (YES in step S409), the process proceeds to step S410. In step S410, the print control apparatus 100 assigns the IP address prepared in the initialization process to the NIC unit other than the NIC unit on the LAN 301 side (hereinafter, such an NIC unit is called an NIC unit on the LAN 302 side). For example, the IP address entered by the user in step S401 is assigned to the NIC unit on the LAN 302 side. In this arrangement, the user can determine the IP address of the NIC unit on the LAN 302 side. Alternatively, an IP address input by DHCP may be assigned to the NIC unit on the LAN 302 side.

Finally, in step S411, the print control apparatus 100 activates the system in the print control apparatus 100. When the activation of the system is completed, for example, the print control apparatus 100 can receive print data via the LAN 302 and send encoded data via the LAN 301.

The process shown in FIG. 4 may be performed just once when the print control apparatus 100 is activated for the first time or every time the print control apparatus 100 is activated.

Further it is noted that in step S403, a time-out period may be set. In this case, when no packet has been received after the time-out period has elapsed in step S403, the print control apparatus 100 displays a message on the display unit 110, which states that the print control apparatus 100 cannot connect to the image forming apparatus 200.

Moreover, when no packet has been received after the time-out period has elapsed in step S403, the print control apparatus 100 may automatically determine one of the NIC units 101 and 104 as being the NIC unit on the LAN 302 side. In this case, the print control apparatus 100 automatically determines the other one as being the NIC unit on the LAN 301 side. It is determined on the basis of default values which of the NIC units 101 and 104 is the NIC unit on the LAN 302 side (or the NIC unit on the LAN 301 side).

Figure 5:
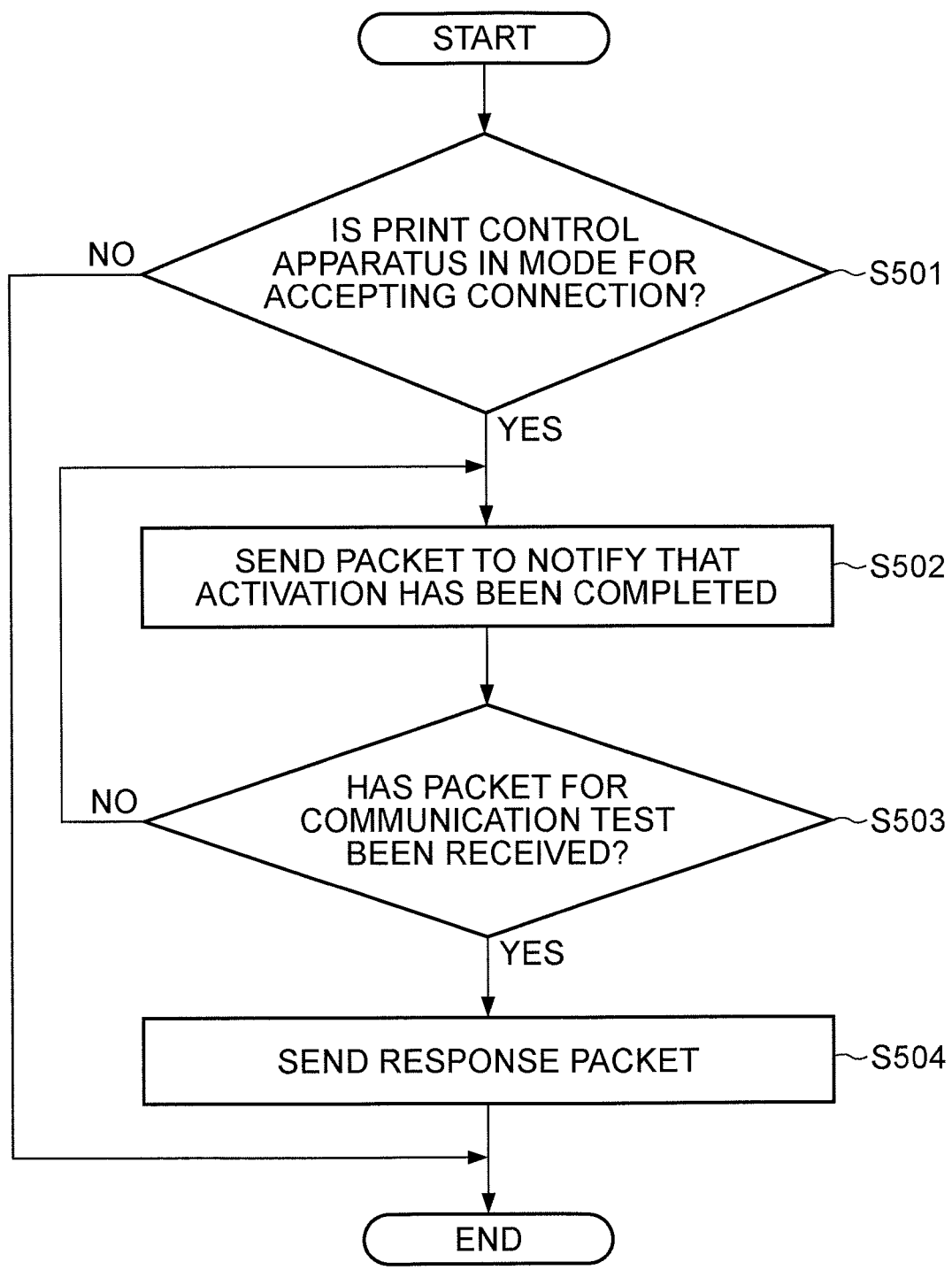
FIG. 5 is a flowchart showing an exemplary process performed by the image forming apparatus according to an aspect of the present invention.

FIG. 5 is a flowchart showing an exemplary process performed by the image forming apparatus 200. The image forming apparatus 200 performs this process by causing the CPU in the image forming apparatus 200 to execute a control program based on the flowchart in FIG. 5.

When the image forming apparatus 200 is activated, the process shown in FIG. 5 is performed while various types of initialization are performed. In this case, it is recommended that the image forming apparatus 200 performs the process shown in FIG. 5 in parallel with other types of initialization. This is because, when these processes are not performed in parallel, the image forming apparatus 200 may keep waiting for the activation of the print control apparatus 100 and may not perform the other types of initialization at all.

In step S501, the image forming apparatus 200 first determines whether the print control apparatus 100 is in a mode for accepting connection. When the image forming apparatus 200 determines that the print control apparatus 100 is not in a mode for accepting connection (NO in step S501), the process is completed. Otherwise, the process proceeds to step S502.

In step S502, the image forming apparatus 200 sends a packet from the interface unit 206 to notify that the image forming apparatus 200 has been activated. The destination IP address and source IP addresses in the packet are a broadcast address and the IP address of the image forming apparatus 200, respectively. The IP address of the image forming apparatus 200 as the source IP address is the same as the IP address of the image forming apparatus 200 recorded in the file stored in the print control apparatus 100. The image forming apparatus 200 may send the packet using a user-specific network protocol or a known network protocol. When a user-specific network protocol is used, the user-specific network protocol needs to be supported by the print control apparatus 100.

Then, in step S503, the image forming apparatus 200 determines whether a packet for communication test has been sent from the print control apparatus 100 after a predetermined period has elapsed. When the print control apparatus 100 is connected to the image forming apparatus 200 via a LAN, the print control apparatus 100 sends the packet for communication test in response to the packet sent in step S502.

When the image forming apparatus 200 determines that the packet for communication test has not been sent from the print control apparatus 100 (NO in step S503), the process goes back to step S501. When the image forming apparatus 200 determines that the packet for communication test has been sent from the print control apparatus 100 (YES in step S503), the process proceeds to step S504 where the image forming apparatus 200 sends from the interface unit 206 a response packet corresponding to the received packet.

In the process shown in FIG. 5, the image forming apparatus 200 first sends a packet to notify that the image forming apparatus 200 has been activated. Alternatively, the image forming apparatus 200 may send a response packet upon receiving a search packet for searching for the image forming apparatus 200 from the print control apparatus 100. In this case, in step S403 in FIG. 4, the print control apparatus 100 sends a search packet from the NIC units 101 and 104. On the other hand, the image forming apparatus 200 sends a response packet upon receiving the search packet. The destination IP address in the response packet is a broadcast address so that the print control apparatus 100 can receive the response packet. The print control apparatus 100 may receive a packet from the image forming apparatus 200 faster by sending a search packet. In this case, time necessary to activate the print control apparatus 100 can be reduced.

Figure 6:
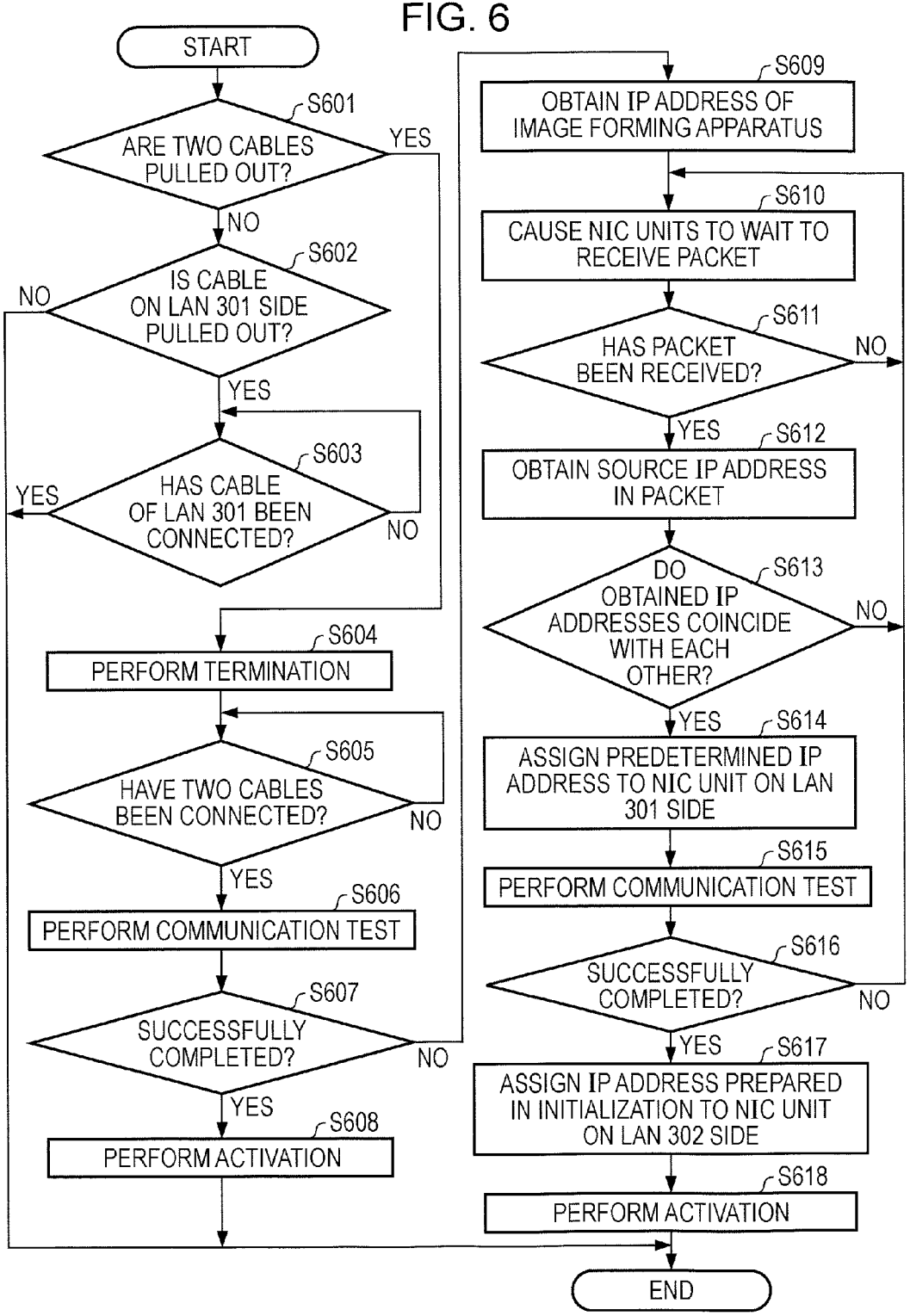
FIG. 6 is a flowchart showing an exemplary process that is performed when at least one network cable is pulled out of connectors according to an aspect of the present invention.

While FIG. 4 shows the process of activating the print control apparatus 100, FIG. 6 shows an exemplary process after activating the print control apparatus 100. FIG. 6 is a flowchart showing an exemplary process that is performed when at least one network cable is pulled out of the connectors. The print control apparatus 100 performs this process by causing the CPU 107 in the print control apparatus 100 to execute a control program based on the flowchart in FIG. 6.

This process is started when the print control apparatus 100 has detected that at least one network cable is pulled out. In step S601, the print control apparatus 100 first determines whether two network cables are pulled out.

When the print control apparatus 100 determines that one network cable is pulled out (NO in step S601), the process proceeds to step S602 where the print control apparatus 100 determines whether the network cable on the LAN 301 side is pulled out.

When the print control apparatus 100 determines that the network cable on the LAN 301 side is pulled out (YES in step S602), the process proceeds to step S603 where the print control apparatus 100 waits for the network cable of the LAN 301 to be connected to the connector. While the network cable is pulled out, the print control apparatus 100 displays a message on the display unit 110, which states that the network cable is pulled out.

On the other hand, when the print control apparatus 100 determines in step S602 that the network cable on the LAN 302 side is pulled out (NO in step S602), the process shown in FIG. 6 is completed because no processing is required. Even when only the network cable of the LAN 302 is pulled out, the same processing as in a case where only the network cable of the LAN 301 is pulled out may be performed. Moreover, even when only the network cable of the LAN 301 is pulled out, the process shown in FIG. 6 may be completed, as in a case where only the network cable of the LAN 302 is pulled out.

When the print control apparatus 100 determines in step S601 that the two network cables are pulled out (YES in step S601), the process proceeds to step S604. In step S604, the print control apparatus 100 performs termination of the system in the print control apparatus 100.

Then, in step S605, the print control apparatus 100 waits for the two network cables to be connected to the connectors. While the network cables are pulled out, the print control apparatus 100 may emit a warning beep or display a message on the display unit 110, which states that the network cables are pulled out.

When the two network cables have been connected to the connectors, the process proceeds to step S606 where communication test is performed between the print control apparatus 100 and the image forming apparatus 200. In the communication test, the print control apparatus 100 sends a packet from the NIC unit on the LAN 301 side to the image forming apparatus 200. Then, in step S607, the print control apparatus 100 determines whether the communication test has been normally completed.

When the print control apparatus 100 has received from the image forming apparatus 200 a response packet corresponding to the packet for the communication test, the print control apparatus 100 determines that the print control apparatus 100 can normally communicate with the image forming apparatus 200, and the communication test has been successfully completed. When the communication test is successfully completed, the process proceeds to step S608 where the print control apparatus 100 activates the system in the print control apparatus 100 and then the process ends. Otherwise, the process proceeds to step S609.

In step S609, the print control apparatus 100 obtains the IP address of the image forming apparatus 200. The IP address of the image forming apparatus 200 is recorded in the file stored in the HDD 105. The print control apparatus 100 obtains the IP address of the image forming apparatus 200 from the file.

Then, in step S610, the print control apparatus 100 causes the NIC units 101 and 104 to wait to receive a packet. In this status, IP addresses may not be assigned to the NIC units 101 and 104, or proper IP addresses may be assigned to the NIC units 101 and 104 as default values.

After the NIC units 101 and 104 are caused to wait to receive a packet, in step S611, the print control apparatus 100 determines whether a packet has been received by either the NIC unit 101 or 104. When the print control apparatus 100 determines that no packet has been received by neither the NIC unit 101 nor 104 (NO in step S611), the process goes back to step S610.

When the print control apparatus 100 determines that a packet has been received by either the NIC unit 101 or 104 (YES in step S611), the process proceeds to step S612. In step S612, the print control apparatus 100 checks the header of the received packet and obtains a source IP address in the packet. Then, in step S613, the print control apparatus 100 determines whether the IP addresses obtained in steps S609 and S612 coincide with each other. When the print control apparatus 100 determines that these IP addresses do not coincide with each other (NO in step S613), the process goes back to step S610 where the process of receiving a packet is performed again.

When the print control apparatus 100 determines that the obtained IP addresses coincide with each other (YES in step S613), the process proceeds to step S614. In step S614, the print control apparatus 100 determines that the NIC unit, which has received a packet including a source IP address that coincides with the IP address of the image forming apparatus 200, is connected to the LAN 301. Then, the print control apparatus 100 assigns the predetermined IP address to the NIC unit on the LAN 301 side.

The predetermined IP address is recorded in the file stored in the HDD 105. The print control apparatus 100 obtains the predetermined IP address from the file and assigns the predetermined IP address to the NIC unit on the LAN 301 side.

Alternatively, the predetermined IP address may be determined on the basis of the IP address of the image forming apparatus 200. In this case, the arrangement is the same as that shown in FIG. 4.

In step S615, the print control apparatus 100 performs communication test between the print control apparatus 100 and the image forming apparatus 200. In the communication test, the print control apparatus 100 sends a packet from the NIC unit on the LAN 301 side to the image forming apparatus 200. When the print control apparatus 100 has received from the image forming apparatus 200 a response packet corresponding to the packet, the print control apparatus 100 determines that the print control apparatus 100 can normally communicate with the image forming apparatus 200, and the communication test is normally completed.

Then, in step S616, the print control apparatus 100 determines whether the communication test has been successfully completed. When the print control apparatus 100 determines that the communication test has not been successfully completed, the process goes back to step S610.

When the print control apparatus 100 determines that the communication test has been successfully completed, the process proceeds to step S617. In step S617, the print control apparatus 100 assigns the IP address prepared in the initialization process to the NIC unit other than the NIC unit on the LAN 301 side. For example, the IP address entered by the user in step S401 in FIG. 4 is assigned to the NIC unit on the LAN 302 side.

And finally, in step S618, the print control apparatus 100 activates the system in the print control apparatus 100.

In the process shown in FIG. 6, when it is determined in step S607 that the communication test has not been normally completed, the process proceeds to step S609. However, before the process proceeds to step S609, the print control apparatus 100 may exchange the IP addresses assigned to the NIC units 101 and 104 and perform the communication test again. This is because each of the network cables of the LAN 301 and the LAN 302 may be connected to a connector other than a connector to which the network cable has been connected. When it is determined that the communication test has been normally completed, the process proceeds to step S608. Otherwise, the process proceeds to step S609.

In step S610, the print control apparatus 100 may send a search packet for searching for the image forming apparatus 200 from the NIC units 101 and 104. In this case, the image forming apparatus 200 sends a response packet upon receiving the search packet. The destination IP address in the response packet is a broadcast address. The print control apparatus 100 may receive a packet from the image forming apparatus 200 faster by sending a search packet. In this case, time necessary to activate the print control apparatus 100 can be reduced.

The initialization process performed in step S401 in FIG. 4 will now be described in detail. When the IP address entered by the user in step S401 is the same as the predetermined IP address, the print control apparatus 100 may display a message on the display unit 110, which states that the use of the IP address entered by the user is prohibited. Similarly, when the IP address entered by the user is the same as an IP address included in the network address space of the LAN 301, the print control apparatus 100 may display a message on the display unit 110, which states that the use of the IP address entered by the user is prohibited.

Alternatively, when the user enters an IP address that is prohibited from being used, an arrangement, such as DHCP, may be adopted for the print control apparatus 100, in which an IP address is automatically obtained. In this case, the IP address entered by the user is replaced with an IP address obtained in such an arrangement.

In this way, a network to which a predetermined data processing apparatus is connected can be connected to either of a plurality of connecting units included in a data processing apparatus according to the exemplary embodiment of the present invention.

The present invention is also achieved by an embodiment in which a storage medium that stores program code of software that performs the functions according to the foregoing exemplary embodiment is provided to a system or an apparatus. In this case, a computer (or a CPU, a micro processing unit (MPU), or the like) included in the system or the apparatus reads and executes the program code stored in the storage medium.

In this case, the program code read from the storage medium performs the functions according to the foregoing exemplary embodiment, and thus the present invention includes the storage medium, which stores the program code.

The following media can be used as storage media that are used to supply the program code: for example, a floppy disk, a hard disk, a magneto-optical disk, a compact disk read only memory (CD–ROM), a CD recordable (CD–R), a CD rewritable (CD–RW), a digital versatile disk read only memory (DVD–ROM), a DVD recordable (DVD–R or DVD+R), a DVD random access memory (DVD–RAM), a DVD rewritable (DVD–RW or DVD+RW), a magnetic tape, and a nonvolatile memory card. The program code may be downloaded via networks.

Moreover, an operating system (OS) operating on a computer may execute some or all of the actual processing to perform the functions of the foregoing exemplary embodiment according to instructions from the program code.

Moreover, the program code read from the storage medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions of the foregoing exemplary embodiment according to instructions from the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-368142 filed Dec. 21, 2005, which is hereby incorporated by reference herein in its entirety.

What is claimed:

1. An information processing apparatus comprising:
a plurality of connecting units, wherein each of the plurality of connecting units is connectable to different networks including a first network on which a predetermined data processing apparatus is provided and a second network that is different from the first network;
a first storage unit configured to store an address of the predetermined data processing apparatus; and
a processor configured to determine, by comparing a source address of data received by each of the plurality of connecting units with the address stored in the first storage unit, which one of the plurality of connecting units is connected to the first network on which the predetermined data processing apparatus is provided, and to assign to the determined connecting unit information necessary to establish communication between the predetermined data processing apparatus and the information processing apparatus.

2. An information processing method performed in an information processing apparatus that includes a plurality of connecting units, wherein each of the plurality of connecting units is connectable to different networks including a first network on which a predetermined data processing apparatus is provided and a second network that is different from the first network, the method comprising:
storing, in a first storage unit, an address of the predetermined data processing apparatus;
determining, by comparing a source address of data received by each of the plurality of connecting units with the address stored in the first storage unit, which one of the plurality of connecting units is connected to the first network on which the predetermined data processing apparatus is provided; and
assigning to the determined connecting unit information necessary to establish communication between the predetermined data processing apparatus and the information processing apparatus.

3. A non-transitory computer readable medium containing computer-executable instructions for controlling an information processing apparatus that includes a plurality of connecting units, wherein each of the plurality of connecting units is connectable to different networks including a first network on which a predetermined data processing apparatus is provided and a second network that is different from the first network, the computer readable medium comprising:
computer-executable instructions for storing, in a first storage unit, an address of the predetermined data processing apparatus;
computer-executable instructions for determining, by comparing a source address of data received by each of the plurality of connecting units with the address stored in the first storage unit, which one of the plurality of connecting units is connected to the first network on which the predetermined data processing apparatus is provided; and
computer-executable instructions for assigning to the determined connecting unit information necessary to establish communication between the predetermined data processing apparatus and the information processing apparatus.

4. The information processing apparatus according to claim 1, further comprising a second storage unit configured to store an address which is to be used as a destination address for data transmitted from the predetermined data processing apparatus to the information processing apparatus,
wherein the processor assigns to the determined connecting unit the address stored in the second storage unit as the information necessary to establish communication between the predetermined data processing apparatus and the information processing apparatus.

5. The information processing apparatus according to claim 1, further comprising a third storage unit configured to store an address to be set as an address of one of the plurality of connecting units that is connected to the second network,
wherein the processor further assigns to the one of the plurality of connecting units that is connected to the second network the address stored in the third storage unit.

6. The information processing apparatus according to claim 1, wherein the data from the source address that matches the address stored in the first storage unit is transmitted from the predetermined data processing apparatus by broadcast transmission.

7. The information processing apparatus according to claim 1, further comprising a conversion unit configured to convert print data received via the second network into data which can be interpreted by the predetermined data processing apparatus,
wherein one of the plurality of connecting units connected to the second network receives the print data via the second network, and
wherein the determined connecting unit connected to the first network transmits the data converted from the print data by the conversion unit to the predetermined processing apparatus via the first network.

8. The information processing method according to claim 2, further comprising:
storing, in a second storage unit, an address which is to be used as a destination address of data transmitted from the predetermined data processing apparatus to the information processing apparatus,
wherein the address stored in the second storage unit is assigned to the determined connecting unit as the information necessary to establish communication between the predetermined data processing apparatus and the information processing apparatus.

9. The information processing method according to claim 2, further comprising:
storing, in a third storage unit, an address to be set as an address of one of the plurality of connecting units that is connected to the second network; and
assigning to the one of the plurality of connecting units that is connected to the second network the address information stored in the third storage unit.

10. The information processing method according to claim 2, wherein the data from the source address that matches the address stored in the first storage unit is transmitted from the predetermined data processing apparatus by broadcast transmission.

11. The information processing method according to claim 2, further comprising:
receiving print data via the second network;
converting the print data received via the second network into data which can be interpreted by the predetermined data processing apparatus; and
transmitting the data converted from the print data, to the predetermined data processing apparatus via the first network.

12. The information processing apparatus according to claim 1, wherein the information necessary to establish communication between the predetermined data processing apparatus and the information processing apparatus is an address determined on the basis of the address of the predetermined data processing apparatus.

13. The information processing apparatus according to claim 1, wherein the information necessary to establish communication between the predetermined data processing apparatus and the information processing apparatus is a subnet mask of the predetermined data processing apparatus.

* * * * *